Dec. 26, 1961     B. H. PINCKAERS     3,015,042
PULSE RESPONSIVE CIRCUIT WITH STORAGE MEANS
Filed Aug. 13, 1959
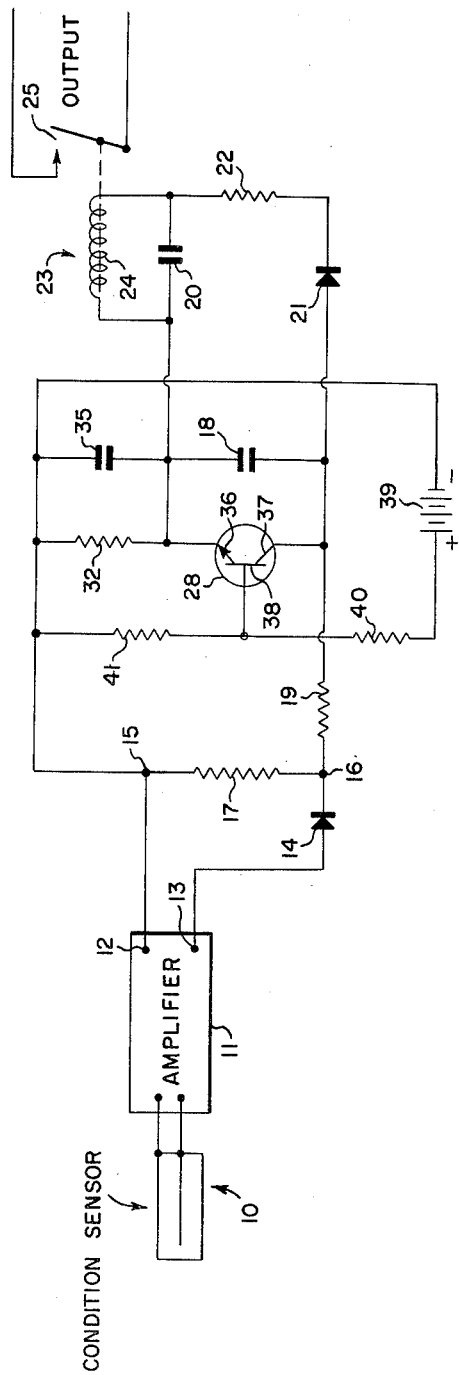
INVENTOR.
BALTHASAR H. PINCKAERS
BY
ATTORNEY

United States Patent Office 3,015,042
Patented Dec. 26, 1961

3,015,042
PULSE RESPONSIVE CIRCUIT WITH
STORAGE MEANS
Balthasar H. Pinckaers, Edina, Minn., assignor to Minneapolis-Honeywell Regulator Company, Minneapolis, Minn., a corporation of Delaware
Filed Aug. 13, 1959, Ser. No. 833,409
6 Claims. (Cl. 307—88.5)

The present invention is concerned with an improved electric apparatus and particularly with an electric apparatus to be utilized with a source of signal voltage having a pulsating direct current characteristic. Furthermore, it is intended that the improved electric apparatus be used with a source of signal voltage which may be of a frequent interval or may be of an irregular and infrequent interval, and in which case it is desired to discriminate against the signal voltages of the irregular and infrequent interval.

Specifically, the apparatus of the present invention acts in a manner resembling that of integration in which an electrical energy storage means is provided to accumulate energy derived from a pulsing direct current signal. In order to discriminate against the signals of irregular and infrequent interval, a unidirectional current conducting device in the form of a transistor is connected to the electrical energy storage means in such a manner as to quickly dissipate the energy stored in the energy storage means in the event that only random and infrequent signals are applied to the energy storage means. This is accomplished by providing a transistor which is controlled in accordance with the electrical current flowing to the energy storage means. In the event that electrical signal voltages of random and infrequent interval are applied to the energy storage means, then the transistor is controlled to discharge the energy storage means.

More specifically, the present invention contemplates a circuit having a pair of input terminals connected to a series connected resistor and capacitor, such that the capacitor is charged in accordance with the voltage applied to the input terminals. Furthermore, a transistor is connected to be controlled in accordance with the voltage across the resistor and is furthermore connected to the capacitor in such a manner as to discharge this capacitor in the absence of voltage across said resistor.

The present invention will be apparent to those skilled in the art upon reference to the following specification, claims, and drawings, of which the single figure is a schematic representation of the preferred embodiment of the present invention.

Referring now to the single figure, this figure discloses a system wherein a condition sensor is connected to the input of an amplifier and the output of the amplifier is connected to the improved electrical apparatus of the present invention. The reference numeral 10 identifies a condition sensor which may take a number of forms. It has been found that the present invention is particularly useful in the case of a condition sensor of the type having a pair of electrodes disposed in an ionizable gaseous medium, which medium ionizes when subjected to a condition to which the condition sensor is sensitive to thereby cause a pulse of electrical current to flow between the electrodes thereof. This type of condition sensor may for example be a Geiger tube. The output of this condition sensor is connected to the input terminals of an amplifier identified by means of the reference numeral 11. This amplifier also may take a number of different forms and may also include a quenching circuit in the case where the condition sensor 10 is in fact a Geiger tube. In any event, the output of amplifier 11, which appears at terminals 12 and 13, is a reproduction of the pulses of electrical current received from the condition sensor 10.

The apparatus as thus far described is conventional. When a condition sensor such as a Geiger tube is subjected to a condition to which it is sensitive, pulses of electrical energy are received at the output terminals 12 and 13 which are of a regular and frequent interval. However, this type of a condition sensor has an inherent background count which provides random and infrequent pulses of energy to the output of terminals 12 and 13 even when the Geiger tube is not subjected to a condition to which it is sensitive. This is an inherent characteristic of this type of condition sensor and means is provided to discriminate against this random and infrequent signal, since this signal does not in fact indicate the presence of the condition which is to be detected. The apparatus of the present invention provides an improved electric apparatus to perform this discriminating function.

The output terminals 12 and 13 of the amplifier are connected through a diode 14 to terminals 15 and 16, which can be identified as input terminals. A resistor 17 is connected across the input terminals 15 and 16 and when an output voltage appears at 12—13, a voltage is developed across this resistor such that the lower terminal is positive with respect to the upper terminal.

This voltage developed across resistor 17 is distributed to a first capacitor 18 through an impedance in the form of a resistor 19 and through an impedance in the form of parallel connected resistor 32 and capacitor 35. The voltage developed across capacitor 18 is distributed to a second capacitor 20 through a diode 21 and a further resistor 22. The output or load of the apparatus consists of a relay 23 having a winding 24 and a normally open switch 25. A number of control functions can be performed by relay 23 and therefore, for purposes of simplicity, a single normally open switch 25 has been shown which can be connected to means, not shown, to perform a variety of control functions upon the condition sensor 10 being subjected to the condition to which it is sensitive.

The reference numeral 28 identifies an N-P-N type transistor which is in part connected across capacitor 18.

Transistor 28 includes an input electrode 36 in the form of an emitter, an output electrode 37 in the form of a collector, and a common electrode 38 in the form of a base. Bias current or voltage for transistor 28 is received from a battery 39 which is connected to a voltage divider including the series connected resistors 40 and 41. The voltage thus developed across resistor 41 is such that its lower terminal is positive and its upper terminal negative, the negative terminal being connected to the negative battery terminal. The base electrode 38 of transistor 28 is connected to the junction of resistors 40 and 41, that is to the positive terminal of resistor 41, whereas the emitter electrode 36 is connected through resistor 32 to the negative terminal of the battery 39. Therefore, the voltage developed across resistor 41 acts as a forward biasing voltage placing a positive voltage on base 38 with respect to emitter 36 and tending to render transistor 28 conductive. However, when a capacitor charging current flows through capacitor 35, a voltage is developed across capacitor 35 and resistor 32 which is of a polarity to overcome the forward biasing voltage of resistor 41 and thereby bias transistor 28 to be nonconductive.

Considering the operation of the apparatus, assume that a single pulse of electrical energy appears at the output terminals 12 and 13 of amplifier 11. It will be remembered that this single pulse of electrical energy may be a single background or random pulse or may be the first of a series of regular and frequent pulses indicative of the presence of the condition to which the condition sensor 10 is sensitive. In any event, this pulse of electrical energy is converted to a unidirectional or D.C. voltage and a voltage is developed across resistor 17 such that input terminal 16 is positive and input terminal 15 is negative. It will be recognized that in the event that the output of amplifier 11 is itself a D.C. voltage, with terminal 13 positive and terminal 12 negative, then diode 14 can be eliminated.

A charging circuit for capacitor 35 can now be traced from the lower terminal of resistor 17 through resistor 19, collector to emitter of transistor 28, and resistor 32 in parallel with capacitor 35 to the upper terminal of resistor 17. From this current flow circuit it can be seen that a voltage is developed across capacitor 35 which renders the lower terminal of capacitor 35 positive with respect to the upper terminal. For a single pulse, as assumed, this voltage across resistor 32 and capacitor 35 tends to bias transistor 28 nonconductive, but does not in fact do so.

Because transistor 28, as related above, is biased by battery 39 into a conductive state, no voltage can be developed across capacitor 18 until transistor 28 has been substantially rendered nonconductive by means of sufficient voltage across capacitor 35. This does not happen until a certain number of input pulses in relatively close succession have been received. That being the case, the voltage of capacitor 35 progressively rises and progressively transistor 28 is rendered less conductive and more and more of the current of each pulse (which flows through resistor 19) is allowed to charge capacitor 18. Capacitor 18 in turn charges capacitor 20 through resistor 22 and diode 21, the latter providing drop out time delay by preventing capacitor 20 from suddenly discharging should capacitor 18 be suddenly discharged, which happens when an input pulse does not arrive soon enough after the previous one.

For a single pulse, no voltage is developed across capacitor 18, because transistor 28 is still in a conductive state. For capacitor 18 to charge, transistor 28 must first be rendered substantially nonconductive by an uninterrupted train of input pulses.

Assume 20 continuous pulses are needed to bring the voltage across capacitor 20 to the operating voltage of the relay. If after 18 pulses, the 19th pulse is slightly delayed, capacitor 18 is substantially discharged by transistor 28 because the voltage across capacitor 35 rapidly decays or discharges through resistor 32. Therefore the voltage present across capacitor 35 and resistor 32 no longer holds transistor 28 in a nonconductive state. With transistor 28 conductive, a collector to emitter current flows to discharge capacitor 18.

In this manner, transistor 28 and its associated circuitry is effective to discriminate against the random and infrequent pulse of voltage which is applied to the input terminals 15 and 16. However, in the event that the pulses of voltage at the input terminals are regular and frequent pulses, capacitor 18 charges and transistor 28 is maintained nonconductive by means of the voltage developed across resistor 32 as well as the voltage built up across capacitor 35. This charge on capacitor 18 is distributed to capacitor 20 and relay winding 24 is energized to close switch 25.

From the above description it can be seen that I have provided an improved electric apparatus which utilizes a series connected capacitor and resistor circuit to provide an integrating function, which apparatus utilizes a transistor current conducting device connected to the capacitor and controlled so that the capacitor is discharged in the event that pulses of current are applied to the capacitor at irregular and infrequent intervals. The transistor is however ineffective to discharge the capacitor in the event that the voltage applied to the capacitor consists of pulses of regular and frequent interval. In this manner, the improved electrical apparatus of the present invention provides a means which effectively discriminates against the random and infrequent pulses of voltage applied to the input of the electric apparatus. Other modifications of this invention will be apparent to those skilled in the art and it is therefore intended that the scope of the present invention be limited solely by the scope of the appended claims.

I claim as my invention:

1. Electric apparatus for use with a source of pulsating unidirectional electrical energy to provide an integrated energy signal therefrom, comprising; input terminals adapted to be connected to a source of pulsating unidirectional electrical energy, electrical energy storage means and impedance means connected in series to said input terminals to derive electrical energy therefrom, a transistor having output means connected to said energy storage means and having input means connected to biasing means to render said transistor normally conductive, and means connecting said input means to said impedance means to control said transistor by the voltage developed across said impedance means as electrical current flows therethrough, said transistor being operative when conductive to substantially short said energy storage means and to allow energy to be stored therein only as said transistor is rendered nonconductive as a result of current flow through said impedance means, said transistor being effective to dissipate the energy stored in said energy storage means upon an interruption in the pulsating electrical signal.

2. Electric apparatus for use with a source of pulsating D.C. signal to provide an integrated signal therefrom and to discriminate against random pulsing of the D.C. signal, comprising; input terminals adapted to be connected to a source of pulsating D.C. signal, a series connected capacitor and impedance connected to said input terminals, said capacitor thereby being adapted to receive an electrical charge, a transistor having a pair of output electrodes connected to said capacitor and a pair of input electrodes connected to said impedance, and biasing means connected to said input electrodes to render said transistor normally conductive, said transistor being controlled by the voltage developed across said impedance as current flows therethrough to render said transistor nonconductive whereupon said capacitor charges, said transistor being effective to quickly discharge said capacitor in the event of random pulsing of the D.C. signal which results in an absence of said voltage developed across said impedance so that a charge appears on said capacitor only upon a regular interval pulsating D.C. signal being applied to said input terminals.

3. Electric apparatus for use in providing an integrated D.C. signal voltage from a pulsating D.C. signal voltage, comprising; electrical energy storage means, impedance means, input terminals adapted to be connected to a source of pulsating D.C. signal voltage, means connecting said energy storage means and said impedance means in a series circuit to said input terminals, load means connected to said energy storage means to be energized in accordance with the energy stored in said energy storage means, a transistor having input means connected to said impedance means and having output means connected to said energy storage means, and biasing means connected to said input means to maintain said transistor normally conductive to thereby shunt said energy storage means, said transistor being controlled by the voltage across said impedance means to be nonconductive as current flows through said impedance means to then allow energy to be stored in said energy storage means, said transistor being effective to dissipate the energy stored in said energy storage means in the event of an interruption of the pulsating D.C. signal voltage.

4. Electric apparatus for use in providing an integrated D.C. signal from a pulsating D.C. signal source and to discriminate against random pulses from the D.C. signal source, comprising; a capacitor, a resistor, circuit means connecting said capacitor and resistor in a series circuit, said circuit means being adapted to be connected to a pulsating D.C. signal source and said resistor having a signal of a given polarity thereacross upon a signal being applied to said circuit means, load means connected to said capacitor to be energized in accordance with the integrated signal on said capacitor, a transistor having input means connected to be controlled to be nonconductive by said given polarity signal across said resistor and having output means connected to said capacitor, and biasing means connected to said input means to maintain said transistor conductive in the absence of said given polarity signal, said transistor being effective to maintain said capacitor discharged in the event that only random pulses of signal are applied thereto.

5. Electric apparatus for use with the source of unidirectional pulsating voltage which may be of either regular interval or infrequent interval, to discriminate against the pulses of infrequent interval and to provide an integrated control voltage to energize a load in the case of the pulses of regular interval, comprising; a pair of terminals adapted to be connected to the source of unidirectional pulsating voltage, a capacitor, a resistor, circuit means connecting said capacitor and resistor in series to said pair of terminals, a load connected to be energized in accordance with the voltage across said capacitor, said resistor having a voltage of a given polarity thereacross as current flows therethrough, a transistor having output means and having input means, biasing means connected to said input means to apply a forward bias to said transistor, means connecting said input means to said resistor to apply a reverse bias to said transistor whenever said given polarity voltage exists thereacross, said transistor being rendered nonconductive as said reverse bias is applied thereto, and further circuit means including said transistor output means connected to shunt said capacitor to allow said capacitor to charge when said transistor is nonconductive and to quickly discharge said capacitor between pulses of voltage of infrequent interval when said transistor is conductive to thereby maintain said load deenergized, said load being energized only in the event of pulses of voltage of regular interval.

6. Electric apparatus for use to provide an integrated control voltage from a source of pulsating D.C. voltage and to discriminate against irregular and infrequent occurrence of such pulses, comprising; a pair of input terminals adapted to be connected to a source of pulsating voltage, a first capacitor and a resistor, circuit means connecting said first capacitor and said resistor in series to said pair of input terminals such that said first capacitor and resistor act to integrate the signal voltage applied to said terminals, a second capacitor connected in parallel with said resistor, a transistor having an input electrode, an output electrode and a common electrode, a source of D.C. voltage, voltage dividing means connected to said source of D.C. voltage, circuit means connecting said voltage dividing means to the input and common electrodes of said transistor to forward bias said transistor to be normally conductive, further circuit means connecting said resistor to the input and common electrodes of said transistor such that, as current flows through said resistor, a reverse bias voltage is developed across said resistor which maintains said transistor nonconductive, circuit means connecting the output and common electrodes of said transistor in shunt with said first capacitor such that upon a voltage of infrequent interval being applied to said input terminals the current flows through said resistor at infrequent intervals and said forward bias is effective to cause said transistor to maintain said first capacitor discharged and thereby discriminate against such infrequent signal voltages, and output means connected to said first capacitor to be controlled by the charge thereon.

References Cited in the file of this patent

UNITED STATES PATENTS

| | | |
|---|---|---|
| 2,797,327 | Kidd | June 25, 1957 |
| 2,892,952 | McVey | June 30, 1959 |
| 2,913,625 | Finkelstein | Nov. 17, 1959 |
| 2,923,837 | Millett | Feb. 2, 1960 |